(12) United States Patent  (10) Patent No.: US 9,857,771 B2
Christmas  (45) Date of Patent: Jan. 2, 2018

(54) ITERATIVE PHASE RETRIEVAL WITH PARAMETER INHERITANCE

(71) Applicant: Two Trees Photonics Limited, Milton Keynes (GB)

(72) Inventor: Jamieson Christmas, Milton Keynes (GB)

(73) Assignee: Two Trees Photonics Limited, Milton Keynes (GB)

( * ) Notice: Subject to any disclaimer, the term of this patent is extended or adjusted under 35 U.S.C. 154(b) by 0 days.

(21) Appl. No.: 14/351,130

(22) PCT Filed: Oct. 17, 2012

(86) PCT No.: PCT/GB2012/052566
§ 371 (c)(1),
(2) Date: Apr. 10, 2014

(87) PCT Pub. No.: WO2013/061029
PCT Pub. Date: May 2, 2013

(65) Prior Publication Data
US 2014/0253987 A1    Sep. 11, 2014

(30) Foreign Application Priority Data
Oct. 26, 2011  (GB) .................................. 1118558.4

(51) Int. Cl.
*G03H 1/08* (2006.01)
*G03H 1/22* (2006.01)
*G03H 1/30* (2006.01)

(52) U.S. Cl.
CPC ......... *G03H 1/0808* (2013.01); *G03H 1/2294* (2013.01); *G03H 2001/085* (2013.01);
(Continued)

(58) Field of Classification Search
CPC .......... G03H 1/00; G03H 1/08–1/0808; G03H 1/0841; G03H 1/0866; G03H 1/0891;
(Continued)

(56) References Cited

U.S. PATENT DOCUMENTS 4,275,454 A   6/1981  Klooster, Jr.
7,227,611 B2  6/2007  Hull et al.
(Continued)

FOREIGN PATENT DOCUMENTS

GB    2 436 676 A   10/2007
GB    2438026 A     11/2007
(Continued)

OTHER PUBLICATIONS

International Search Report and Written Opinion issued in International Application No. PCT/GB2013/000167, "Phase Retrieval", dated Jul. 22, 2013.
(Continued)

*Primary Examiner* — Stephone B Allen
*Assistant Examiner* — Jyotsna Dabbi
(74) *Attorney, Agent, or Firm* — McDonnell Boehnen Hulbert & Berghoff LLP

(57) ABSTRACT

An iterative method of retrieving phase information in the Fourier domain representative of the $n^{th}$ frame of a sequence of 2D image frames. The method comprises using at least one parameter related to retrieval of phase information Fourier domain of the (n−1) frame as a starting point for the iterative method.

10 Claims, 7 Drawing Sheets

(52) U.S. Cl.
CPC ............ *G03H 2001/0816* (2013.01); *G03H 2001/2215* (2013.01); *G03H 2001/306* (2013.01); *G03H 2210/20* (2013.01); *G03H 2225/32* (2013.01)

(58) Field of Classification Search
CPC .......... G03H 1/16; G03H 1/22–1/2205; G03H 1/2294; G03H 1/26; G03H 1/10; G03H 2001/306; G03H 2001/0816; G03H 2001/085–2001/0858; G03H 2001/0875–2001/0883; G03H 2001/2207–2001/221; G03H 2001/2218; G03H 2201/2297; G03H 2210/441; G03H 2225/32–2225/34; G03H 2240/00–2240/11; H04N 8/74; G02B 27/52; G11B 7/0065; G11C 13/042
See application file for complete search history.

(56) References Cited

U.S. PATENT DOCUMENTS

| | | | |
|---|---|---|---|
| 8,072,488 | B2 | 12/2011 | Cable et al. |
| 8,085,453 | B2 | 12/2011 | Christmas et al. |
| 8,159,733 | B2 | 4/2012 | Christmas et al. |
| 8,654,048 | B2 | 2/2014 | Collings et al. |
| 8,878,759 | B2 | 11/2014 | Crossland et al. |
| 2001/0050787 | A1 | 12/2001 | Crossland et al. |
| 2002/0060831 | A1* | 5/2002 | Gerchberg .............. 359/237 |
| 2004/0027626 | A1* | 2/2004 | Yamauchi et al. ........... 359/3 |
| 2004/0042161 | A1 | 3/2004 | Cameron et al. |
| 2005/0041271 | A1 | 2/2005 | Tomoyoshi |
| 2005/0134709 | A1 | 6/2005 | Ishii et al. |
| 2005/0157188 | A1* | 7/2005 | Kubo .................. H04N 5/217 348/241 |
| 2007/0024999 | A1* | 2/2007 | Crossland et al. ......... 359/859 |
| 2008/0068852 | A1 | 3/2008 | Goihl |
| 2008/0106653 | A1 | 5/2008 | Scott |
| 2008/0192312 | A1 | 8/2008 | Hendricks et al. |
| 2008/0198372 | A1 | 8/2008 | Shaoher |
| 2009/0002787 | A1 | 1/2009 | Cable et al. |
| 2009/0128875 | A1* | 5/2009 | Christmas et al. .......... 359/28 |
| 2009/0257104 | A1 | 10/2009 | Cable et al. |
| 2010/0165429 | A1 | 7/2010 | Buckley et al. |
| 2011/0002019 | A1 | 1/2011 | Routley et al. |
| 2011/0157667 | A1 | 6/2011 | Lacoste et al. |
| 2011/0298945 | A1* | 12/2011 | Chen .................. H04N 5/165 348/223.1 |
| 2012/0133937 | A1 | 5/2012 | Heintzmann et al. |
| 2013/0022222 | A1 | 1/2013 | Zschau et al. |
| 2013/0265622 | A1 | 10/2013 | Christmas et al. |
| 2015/0009695 | A1 | 1/2015 | Christmas et al. |
| 2015/0022526 | A1 | 1/2015 | Christmas et al. |
| 2015/0346491 | A1 | 12/2015 | Christmas |

FOREIGN PATENT DOCUMENTS

| | | |
|---|---|---|
| GB | 2446852 A | 8/2008 |
| GB | 2 461 294 A | 12/2009 |
| GB | 2 509 180 | 6/2014 |
| JO | 2011507022 A | 3/2011 |
| JP | H06-027863 | 4/1994 |
| JP | H11-003128 | 6/1999 |
| JP | 2003-515180 A | 4/2003 |
| JP | 2004-538519 A | 12/2004 |
| JP | 2005-181854 A | 7/2005 |
| JP | 2005210215 A | 8/2005 |
| JP | 2006 301020 A | 11/2006 |
| JP | 2007-523359 A | 8/2007 |
| JP | 2008-544307 A | 12/2008 |
| JP | 2009-536748 A | 10/2009 |
| JP | 2010258851 A | 11/2010 |
| JP | 2011-508911 A | 3/2011 |
| JP | 2013-524270 A | 6/2013 |
| WO | WO 01/35155 A1 | 5/2001 |
| WO | WO 03/014837 A1 | 2/2003 |
| WO | WO 2003/060612 A1 | 7/2003 |
| WO | WO 2005/059881 A2 | 6/2005 |
| WO | WO 2006/134404 A1 | 12/2006 |
| WO | WO 2007/131649 A1 | 11/2007 |
| WO | WO 2007/131650 A1 | 11/2007 |
| WO | WO 2009/087358 A1 | 7/2009 |
| WO | WO 2009/156752 | 12/2009 |

OTHER PUBLICATIONS

Combined Search and Examination Report issued in Great Britain Application No. GB1206496.0, dated Oct. 1, 2012 (6 pages).
Notification of Transmittal of The International Search Report and The Written Opinion of the International Searching Authority, PCT/GB2012/052566, dated Dec. 14, 2012.
Combined Search and Examination Report, GB 1118558.4, dated Mar. 21, 2012.
Difato, F., et al., "Spatial Light Modulators for Complex Spatiotemporal Illumination of Neuronal Networks," Neuromethods, 67: 61-81 (2012).
Ferri, L.C., "Visualization of 3D Information with Digital Holography Using Laser Printers," Computers & Graphics, 25:309-321 (2001).
Inoue, T., et al., "LCOS Spatial Light Modulator Controlled by 12-Bit Signals for Optical Phase-Only Modulation," Proceedings of SPIE, International Society for Optical Engineering, vol. 6487, pp. 64870Y-1 (2007).
Mias, S. and H. Camon, "A Review of Active Optical Devices: II. Phase Modulation," Journal of Micromechanics and Microengineering, 18(8): 1-22 (2008).
Miao et al., "Phase Retrieval from the magnitude of the Fourier transforms of nonperiodic objects," *J. Opt. Soc. Am.*, vol. 15, No. 6, pp. 1662-1669 (Jun. 1998).
Notification of Transmittal of the International Search Report and Written Opinion for PCT/GB2013/050274, titled: Lighting Device for Headlights With a Phase Modulator, dated May 7, 2013.
Great Britain Search Report for GB1202123.4, dated Jun. 19, 2013.
Notification of Transmittal of International Search Report and the Written Opinion of the International Searching Authority for Int'l Appl. No. PCT/GB2011/051328, titled: 2D/3D Holographic Display System, dated Sep. 21, 2011.
Notification of Reason(s) for Refusal for Appl. No. 2014-537712, dated Mar. 17, 2015 (with English Abstract).
Notification of Reason(s) for Refusal for Appl. No. 2014-537712, dated Sep. 30, 2014 (with English Abstract).
Buckley, E., et al., "Full Colour Holographic Laser Projector HUD", SID Vehicles and Photons 2008, 15th Annual Symposium on Vehicle Displays, pp. 1-5, Oct. 17, 2008.
Fukaya, N., et al., "Improved Electro-Holographic Display Using Liquid Crystal Devices to Diminish the System Size," Proceedings of International Conference on High Technology : Image Science and Technology, Evolution and Promise, World Techno Fair in Chiba pp. 355-363, Sep. 11, 1996.
"Japanese Application Serial No. 2016000871, Notification of Refusal dated Nov. 1, 2016", in English, 4 pgs.

* cited by examiner

ITERATIVE PHASE RETRIEVAL WITH PARAMETER INHERITANCE

This application is the U.S. National Stage of International Application No. PCT/GB2012/052566, filed Oct. 17, 2012, which designates the U.S., published in English, and claims priority under 35 U.S.C. §119 or 365(c) to Great Britain Application No. 1118558.4, filed Oct. 26, 2011.

FIELD OF THE INVENTION

The present disclosure relates to the field of image projection. Embodiments disclosed herein generally relate to an iterative method of retrieving phase information and a projector for forming a 2D video image. More specifically, embodiments disclosed herein generally relate to a modified Gerchberg-Saxton algorithm for retrieving phase information in real-time from each 2D intensity distribution in a sequence of 2D intensity distributions, such as a 2D video sequence of images.

BACKGROUND

Light scattered from an object contains both amplitude and phase information. This amplitude and phase information can be captured on, for example, a photosensitive plate by well known interference techniques to form a holographic recording, or "hologram", comprising interference fringes. The "hologram" may be reconstructed by illuminating it with suitable light to form a holographic reconstruction, or image, representative of the original object.

It has been found that a holographic reconstruction of acceptable quality can be formed from a "hologram" containing only phase information related to the original object. Such holographic recordings may be referred to as phase-only holograms or kinoforms.

The term "hologram" therefore relates to the recording which contains information about the object and can be used to form a reconstruction representative of the object. The hologram may contain information about the object in the frequency, or Fourier, domain.

Computer-generated holography is a technique to numerically simulate the interference process, it may use Fourier techniques for example, to produce a computer-generated phase-only hologram. The computer-generated phase-only hologram may be used to produce a holographic reconstruction representative of an object.

It has been proposed to use holographic techniques in a two-dimensional image projection system. The system may accept a temporal sequence of 2D image frames as an input. The input may be converted into a real-time sequence of corresponding holograms (for example, phase-only holograms) wherein each hologram corresponds to one image frame. The holograms may be reconstructed in real-time on a screen to produce a 2D projection representative of the input. Accordingly, there may be provided a real-time 2D video projector to project a sequence of image frames using a sequence of computer-generated holograms.

An advantage of projecting video images via phase-only holograms is the ability to control many image attributes via the computation method—e.g. the aspect ratio, resolution, contrast and dynamic range of the projected image. A further advantage of phase-only holograms is that no optical energy is lost by way of amplitude modulation.

A computer-generated phase-only hologram may be "pixellated". That is, the phase only hologram may be represented on an array of discrete phase elements. Each discrete element may be referred to as a "pixel". Each pixel may act as a light modulating element such as a phase modulating element. A computer-generated phase-only hologram may therefore be represented on an array of phase modulating elements such as a liquid crystal on silicon (LCOS) spatial light modulator (SLM). The LCOS may be reflective meaning that modulated light is output from the LCOS in reflection.

Each phase modulating element, or pixel, may vary in state to provide a controllable phase delay to light incident on that phase modulating element. An array of phase modulating elements, such as a LCOS SLM, may therefore represent (or "display") a computationally determined phase-delay distribution. If the light incident on the array of phase modulating elements is coherent, the light will be modulated with the holographic information, or hologram. The holographic information may be in the frequency, or Fourier, domain.

Alternatively, the phase-delay distribution may be recorded on a kinoform. The word "kinoform" may be used generically to refer to a phase-only holographic recording, or hologram.

The phase-delay distribution may be applied to an incident light wave (by illuminating the LCOS SLM, for example) and reconstructed. The position of the reconstruction in space may be controlled by using a optical Fourier transform lens, to form the holographic reconstruction, or "image", in the spatial domain.

A computer-generated hologram may be calculated in a number of ways, including using algorithms such as Gerchberg-Saxton. The Gerchberg-Saxton algorithm may be used to derive phase information in the Fourier domain from amplitude information in the spatial domain (such as a 2D image). That is, phase information related to the object may be "retrieved" from intensity, or amplitude, only information in the spatial domain. Accordingly, a phase-only holographic representation of an object in the Fourier domain may be calculated.

The holographic reconstruction may be formed by illuminating the Fourier domain hologram and performing an optical Fourier transform using a Fourier transform lens, for example, to form an image (holographic reconstruction) at a reply field such as on a screen.

FIG. 1 shows an example of using a reflective SLM, such as a LCOS, to produce a holographic reconstruction at a replay field location, in accordance with the present disclosure.

A light source (110), for example a laser or laser diode, is disposed to illuminate the SLM (140) via a collimating lens (111). The collimating lens causes a generally planar wavefront of light to become incident on the SLM. The direction of the wavefront is slightly off-normal (i.e. two or three degrees away from being truly orthogonal to the plane of the transparent layer). The arrangement is such that light from the light source is reflected off a mirrored rear surface of the SLM and interacts with a phase-modulating layer to form an exiting wavefront (112). The exiting wavefront (112) is applied to optics including a Fourier transform lens (120), having its focus at a screen (125).

The Fourier transform lens receives (phase modulated) light from the SLM and performs a frequency-space transformation to produce a holographic reconstruction at the screen (125) in the spatial domain.

In this process, the light from the light source is generally evenly distributed across the SLM (140), and across the phase modulating layer (array of phase modulating elements). Light exiting the phase-modulating layer may be distributed across the screen. There is no correspondence between a specific image region of the screen and any one phase-modulating element.

The Gerchberg Saxton algorithm considers the phase retrieval problem when intensity cross-sections of a light beam, $I_A(x,y)$ and $I_B(x,y)$, in the planes A and B respectively, are known and $I_A(x,y)$ and $I_B(x,y)$ are related by a single Fourier transform. With the given intensity cross-sections, an approximation to the phase distribution in the planes A and B, $\Phi_A(x,y)$ and $\Phi_B(x,y)$ respectively, is found. The Gerchberg-Saxton algorithm finds good solutions to this problem by following an iterative process.

The Gerchberg-Saxton algorithm iteratively applies spatial and spectral constraints while repeatedly transferring a data set (amplitude and phase), representative of $I_A(x,y)$ and $I_B(x,y)$, between the spatial domain and the Fourier (spectral) domain. The spatial and spectral constraints are $I_A(x,y)$ and $I_B(x,y)$ respectively. The constraints in either the spatial or spectral domain are imposed upon the amplitude of the data set. The corresponding phase information is retrieved through a series of iterations.

It is desirable to provide a method of phase retrieval which can be implemented in a way that provides convergence more rapidly than the prior art.

SUMMARY OF THE INVENTION

Aspects of the invention are defined in the appended independent claims.

In summary, the present disclosure relates to using parameters associated with the calculation of the hologram representative of a frame of a sequence of 2D image frames as a starting point for the calculation of the hologram representative of the following frame. Such a technique may generally be referred to as "frame inheritance".

The number of iterations required to retrieve an acceptable phase value is significantly reduced because at least one parameter related to phase retrieval of the previous frame is inherited. The phase retrieval method in accordance with the present disclosure therefore converges on an acceptable phase delay distribution (hologram) more rapidly—in other words, in less iterations of the phase retrieval method.

For example, a phase delay distribution may be considered acceptable if the mean squared error value or peak signal to noise ratio is less than a predetermined threshold.

Embodiments disclosed herein relate to projection of a 2D video image including real-time retrieval of a phase distribution (hologram) in relation to each frame of the video sequence. Accordingly, only a finite amount of time is available to calculate the hologram and therefore only a finite number of iterations of the method may be performed. This amount of time may be related to the inter-frame time, for example. Since the improved method in accordance with the present disclosure converges on an acceptable solution more rapidly, the overall quality of a hologram calculated in the available time is improved.

A further surprising effect of inheriting parameters relating to the previous frame is that later frames are of even higher quality than the earlier frames because it is found that even fewer iterations are required to reach an acceptable quality hologram. That is, the method gets better with each passing frame. This may be because later frames cumulatively benefit from an improvement in each of the earlier frames.

BRIEF DESCRIPTION OF THE DRAWINGS

Embodiments of the present invention will now be described to the accompanying drawings in which.

In the figures like reference numerals referred to like parts.

DETAILED DESCRIPTION OF THE DRAWINGS

Holographically generated 2D video images are known to possess significant advantages over their conventionally projected counterparts, especially in terms of definition and efficiency. However, the computational and hardware complexity of the current hologram generation algorithms previously precluded their use in real-time applications. Recently these problems have been solved—see, for example, published PCT application WO 2005/059881 incorporated herein by reference.

Modified algorithms based on Gerchberg-Saxton have been developed—see, for example, co-pending published PCT application WO 2007/131650 incorporated herein by reference.

These improved techniques are able to calculate holograms at a sufficient speed that 2D video projection is realised. Embodiments described herein relate to 2D video projection using a computer-generated hologram calculated using such a modified Gerchberg-Saxton algorithm.

Figure 1:
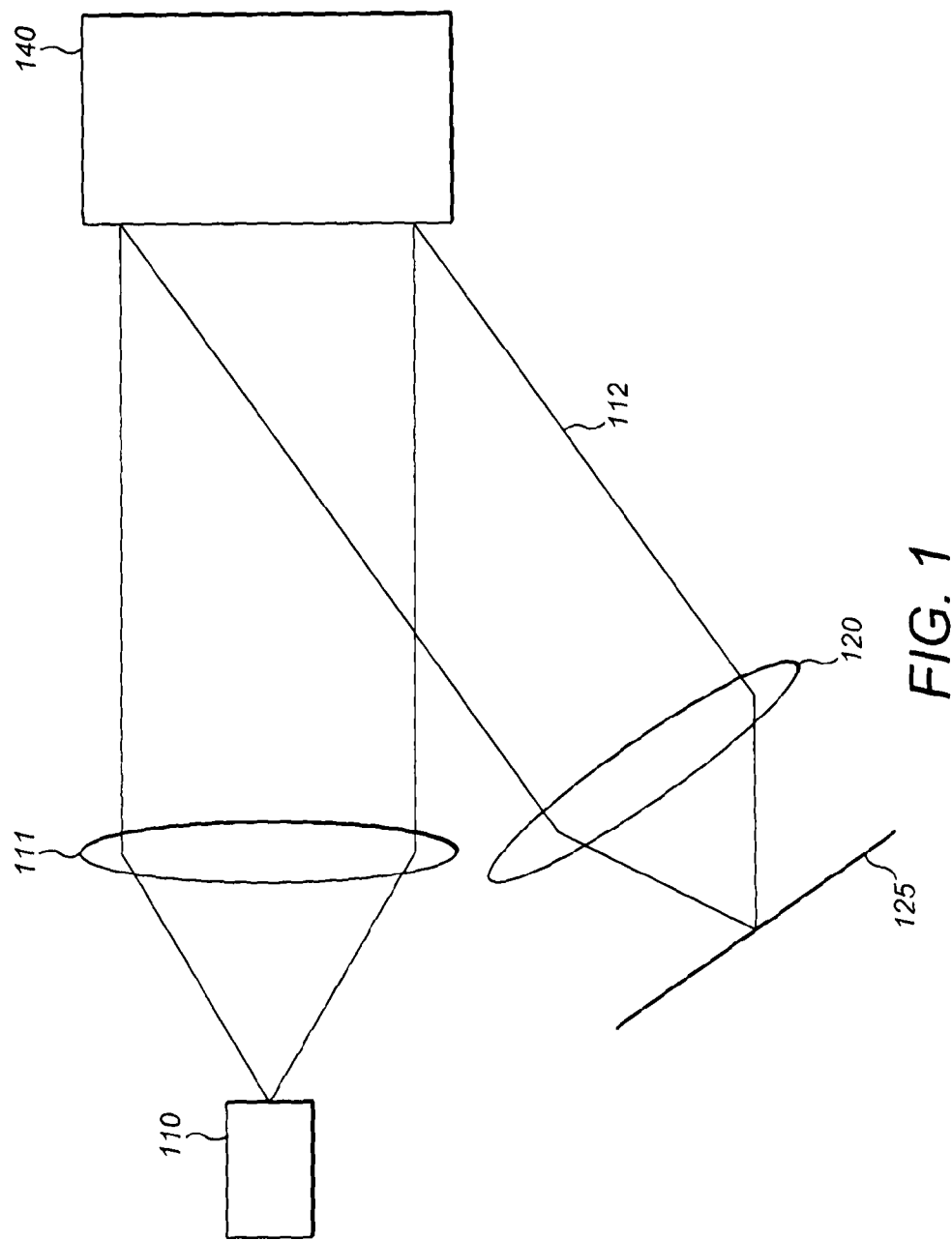
FIG. 1 is a schematic showing a reflective SLM, such as a LCOS, produce a holographic reconstruction at a replay field location.
Figure 2:
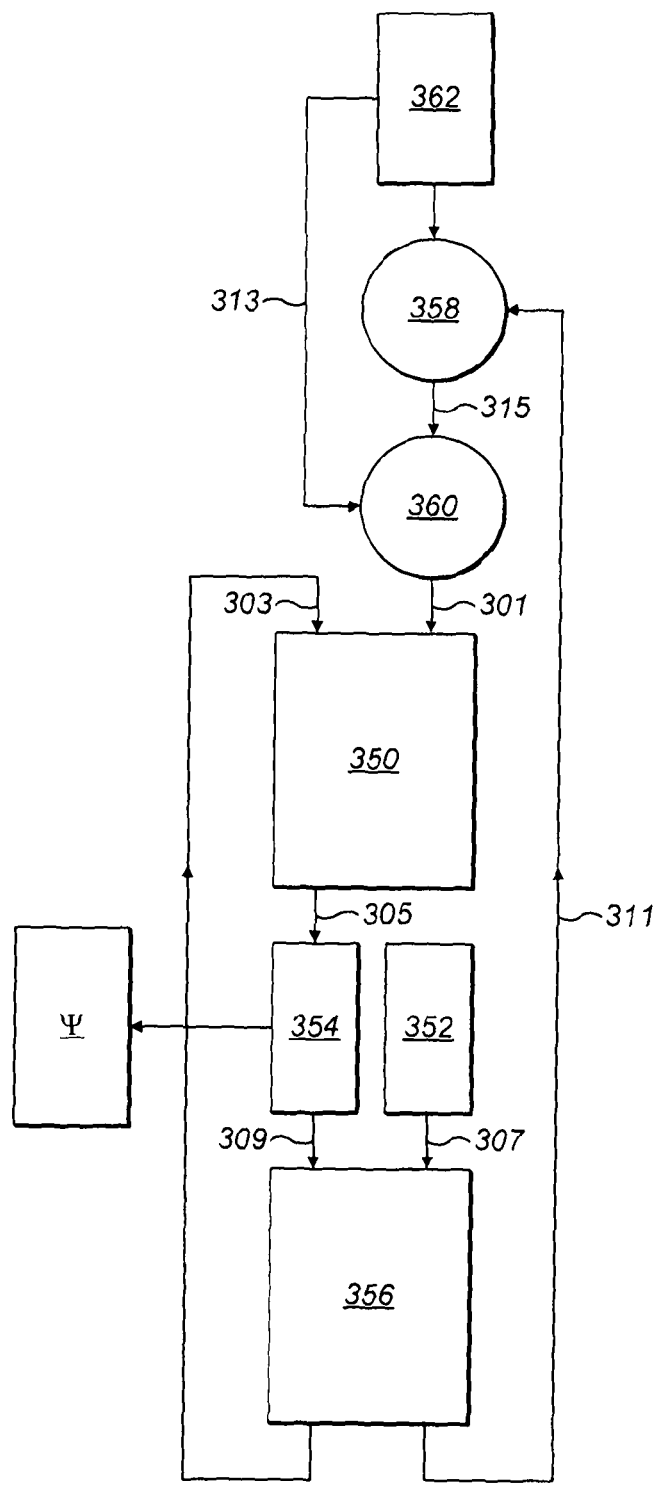
FIG. 2 is a chart showing the function of a modified Gerchberg-Saxton algorithm.

FIG. 2 shows a modified algorithm which retrieves the phase information $\psi[x,y]$ of the Fourier transform of the data set which gives rise to a known amplitude information $T[x,y]$ 362. Amplitude information $T[x,y]$ 362 is representative of a target image (e.g. a photograph). The phase information $\psi[x,y]$ is used to produce a holographic representative of the target image at an image plane.

Since the magnitude and phase are intrinsically combined in the Fourier transform, the transformed magnitude (as well as phase) contains useful information about the accuracy of the calculated data set. Thus, the algorithm may provided feedback on both the amplitude and the phase information.

The algorithm shown in FIG. 2 can be considered as having a complex wave input (having amplitude information 301 and phase information 303) and a complex wave output (also having amplitude information 311 and phase information 313). For the purpose of this description, the amplitude and phase information are considered separately although they are intrinsically combined to form a data set. It should be remembered that both the amplitude and phase information are themselves functions of the spatial coordinates x and y and can be considered amplitude and phase distributions.

Referring to FIG. 2, processing block 350 produces a Fourier transform from a first data set having magnitude information 301 and phase information 303. The result is a second data set, having magnitude information and phase information $\psi_n[x,y]$ 305. The amplitude information from processing block 350 is set to a distribution representative of the light source but the phase information $\psi_n[x,y]$ 305 is retained. Phase information 305 is quantised by processing block 354 and output as phase information $\psi[x,y]$ 309. Phase information 309 is passed to processing block 356 and combined with the new magnitude by processing block 352. The third data set 307, 309 is applied to processing block 356 which performs an inverse Fourier transform. This produces a fourth data set $\psi_n[x,y]$ in the spatial domain having amplitude information $|R_n[x, y]|$ 311 and phase information $\angle R_n[x, y]$ 313.

Starting with the fourth data set, its phase information 313 forms the phase information of a fifth data set, applied as the first data set of the next iteration 303'. Its amplitude information $R_n[x,y]$ 311 is modified by subtraction from amplitude information $T[x,y]$ 362 from the target image to produce an amplitude information 315 set. Scaled amplitude information 315 (scaled by a) is subtracted from target amplitude information $T[x,y]$ 362 to produce input amplitude information $\eta[x,y]$ 301 of the fifth data set for application as first data set to the next iteration. This is expressed mathematically in the following equations:

$$R_n+1[x,y]=F'\{\exp(i\psi_n[u,v])\}$$

$$\psi_n[u,v]=\angle F\{\eta \cdot \exp(i\angle R_n[x,y])\}$$

$$\eta=T[x,y]-\alpha(|R_n[x,y]|-T[x,y])$$

Where:
F' is the inverse Fourier transform.
F if the forward Fourier transform.
R is the replay field.
T is the target image.
$\angle$ is the angular information.
$\psi$ is the quantized version of the angular information.
$\epsilon$ is the new target magnitude, $\epsilon \geq 0$
$\alpha$ is a gain element ~1

The gain element $\alpha$ may be predetermined based on the size and rate of the incoming target image data.

In the absence of phase information from the preceding iteration, the first iteration of the algorithm uses a random phase generator to supply phase information as a starting point.

In an alternative modification, the resultant amplitude information from processing block 350 is not discarded. The target amplitude information 362 is subtracted from amplitude information to produce anew amplitude information. A multiple of amplitude information is subtracted from amplitude information 362 to produce the input amplitude information for processing block 356.

Further alternatively, the phase is not fed back in full and only a portion proportion to its change over the last two iterations is fed back.

These modifications to the Gerchberg-Saxton algorithm relate to feeding back parameters within the phase retrieval calculation for a particular frame. This is distinct from inheriting parameters related to the phase retrieval calculation for the preceding frame.

In summary, there is provided an improved method of phase retrieval. This method may be used in conjunction with existing phase retrieval algorithms, such as Gerchberg-Saxton or a modified version of Gerchberg-Saxton.

There is provided a method of retrieving phase information in the Fourier domain representative of the $n^{th}$ frame of a sequence of 2D image frames, the method comprising using at least one parameter related to retrieval of phase information in the Fourier domain of the (n−1) frame as a starting point for the iterative method.

The at least one parameter may be phase information in the Fourier domain and/or amplitude information in the Fourier domain. In embodiments, the at least one parameter may be control parameters such as those used to control gain or attenuation.

There is also provided a projector for forming a 2D video image, the projector comprising: a spatial light modulator comprising a 2D array of phase modulating elements; processing means arranged to retrieve phase information in the Fourier domain representative of the $n^{th}$ frame of a sequence of 2D image frames in the spatial domain including using at least one parameter related to retrieval of phase information in the Fourier domain of the (n−1) frame as a starting point; and driving means arranged to drive the array of phase modulating elements of the spatial light modulator to display data representative of a Fourier transform of a nth frame of a sequence of 2D image frames.

Embodiments relate to holographic projection that may be used as a generic display medium and therefore capable of showing moving pictures. This requires the system to be able to compute and display a minimum of 25 frames per second. One approach would be to simply execute the phase computation algorithm 25 times per second, however in most moving pictures the difference from one frame to the next is relatively small and this could provide a mechanism to reduce to computation time or improve the image quality.

Figure 3:
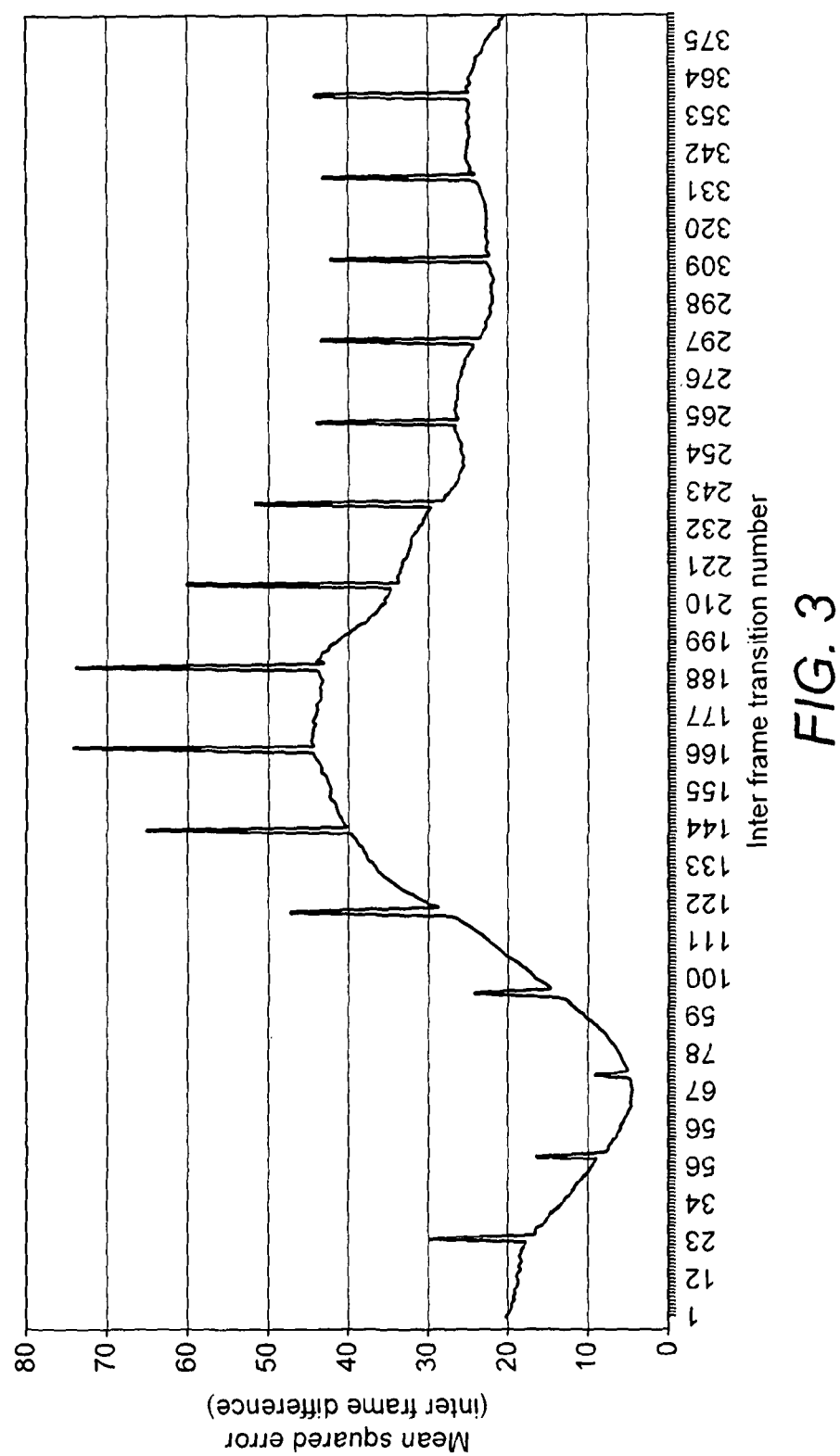
FIG. 3 shows the mean squared error differences from one frame to the next for an example AVI file.

FIG. 3 shows the mean squared error differences from one frame to the next for an example AVI file containing an image of the Earth revolving. The spikes in the waveform are key frames.

The aforementioned algorithms, based on Gerchberg-Saxton, require a number of iterations to be able to resolve the target image from a phase only modulation scheme. This is due to the initial conditions where the random phase seed has no statistical link to target image. After each iteration the statistical relationship between the hologram (Fourier) domain and far field (spatial domain) improves. If, after the first frame has been resolved, the phase and resultant image are retained the next frame could be treated as an error vector to be corrected. This idea forms the basis of frame inheritance. In embodiments, the calculated amplitude information in the Fourier domain and/or phase information in the Fourier domain form the magnitude information 301 and/or phase information 303, respectively, of the first data set of the next frame. In other embodiments, different parameters of the algorithm are used as at least a starting point for the calculation in relation to the next frame.

Figure 4:
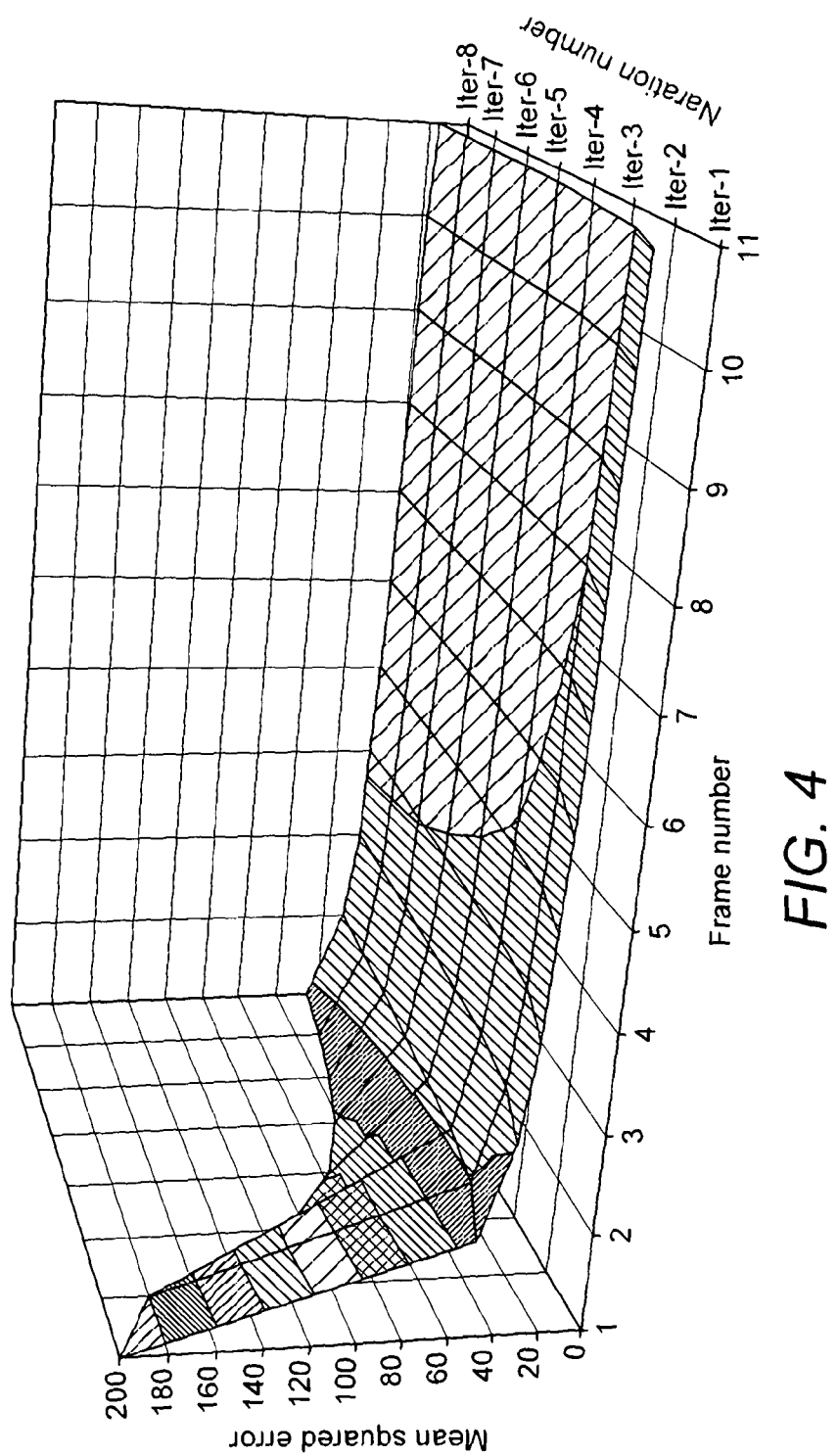
FIG. 4 shows the mean squared error of a sequence of frames processed in accordance with an embodiment.

The improved method in accordance with the present invention was implemented and tested against the first 10 frames of the AVI file of the Earth revolving. The mean squared error for each frame was monitored during the iterative process and is shown in FIG. 4. The advantages of inheriting the resultant magnitude and phase are very clear; the mean squared error of each frame continues to improve reaching a mean squared error of 14.85. This is perhaps best expressed as a peak signal to noise ratio (PSNR) of 36.4 dB, a 5.5 dB improvement over the standalone algorithm implementation.

One interesting result is that after the algorithm has processed 5 frames there is very little improvement in the image quality beyond 3 or 4 iterations. This implies that it is possible to not only improve the quality of the image but do so with less iterations. This may in part due to the very similar nature of the frames in the chosen AVI file. To verify this hypothesis, the algorithm was tested against a second AVI file which contained a large number of rapidly changing scenes.

Figure 5:
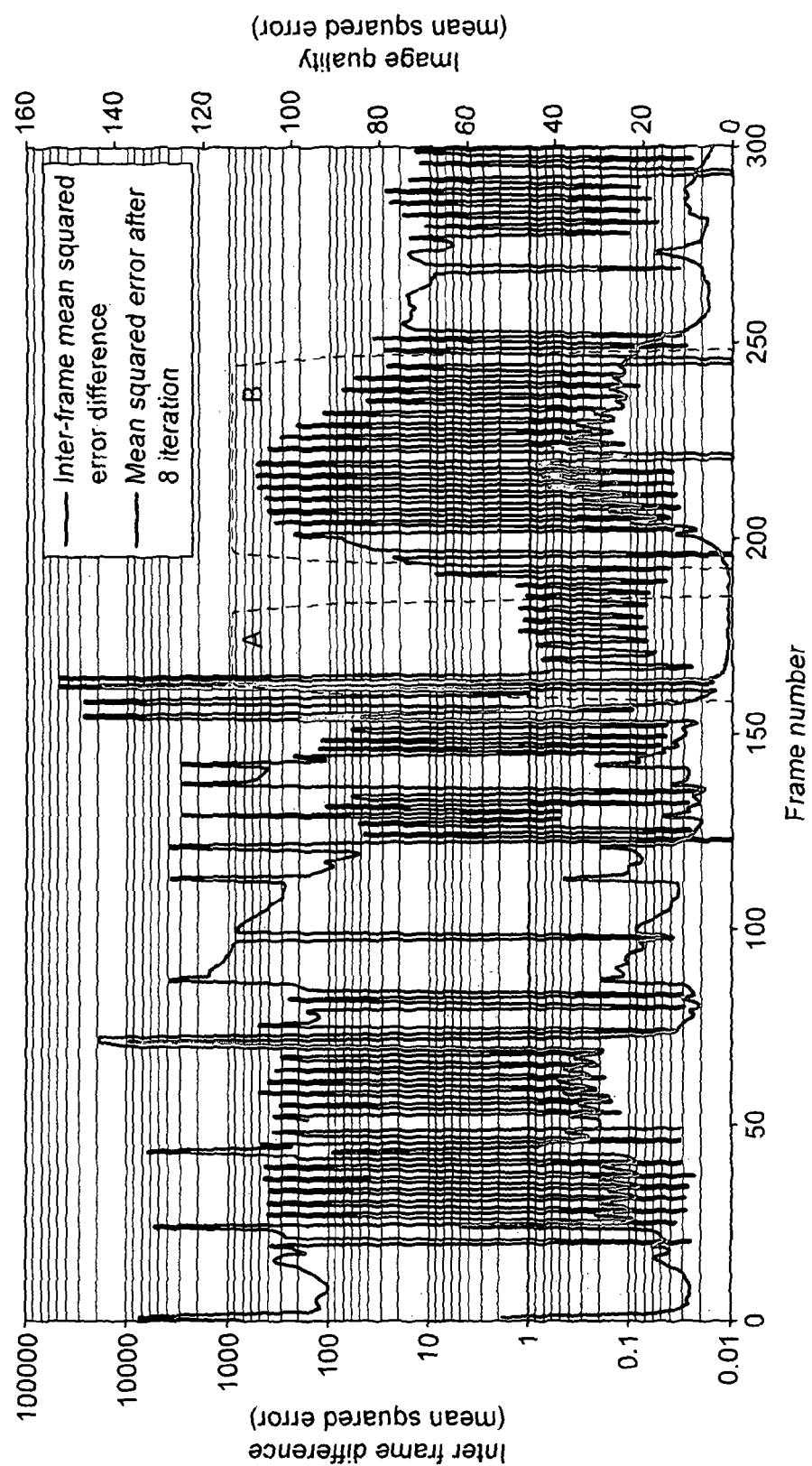
FIG. 5 shows the effect of rapid changes upon the mean squared error of frames utilising inherited magnitude and phase.

The results shown in FIG. 5 indicate that after significant scene changes the algorithm is able to improve the image quality in successive frames provided that the scene is not changing too rapidly (as shown in region A). If the scene is constantly changing then the algorithm struggles to maintain the image quality (as shown in region B).

The response of the algorithm indicates that it is better to use a dynamic system when deciding how many iterations are required, for example in scenes with a small amount of change a low number of iterations may be applied, whereas rapidly changing scenes may utilise more iterations. One way to implement such a system would be to target a quality level specified in terms of mean squared error.

Figure 6:
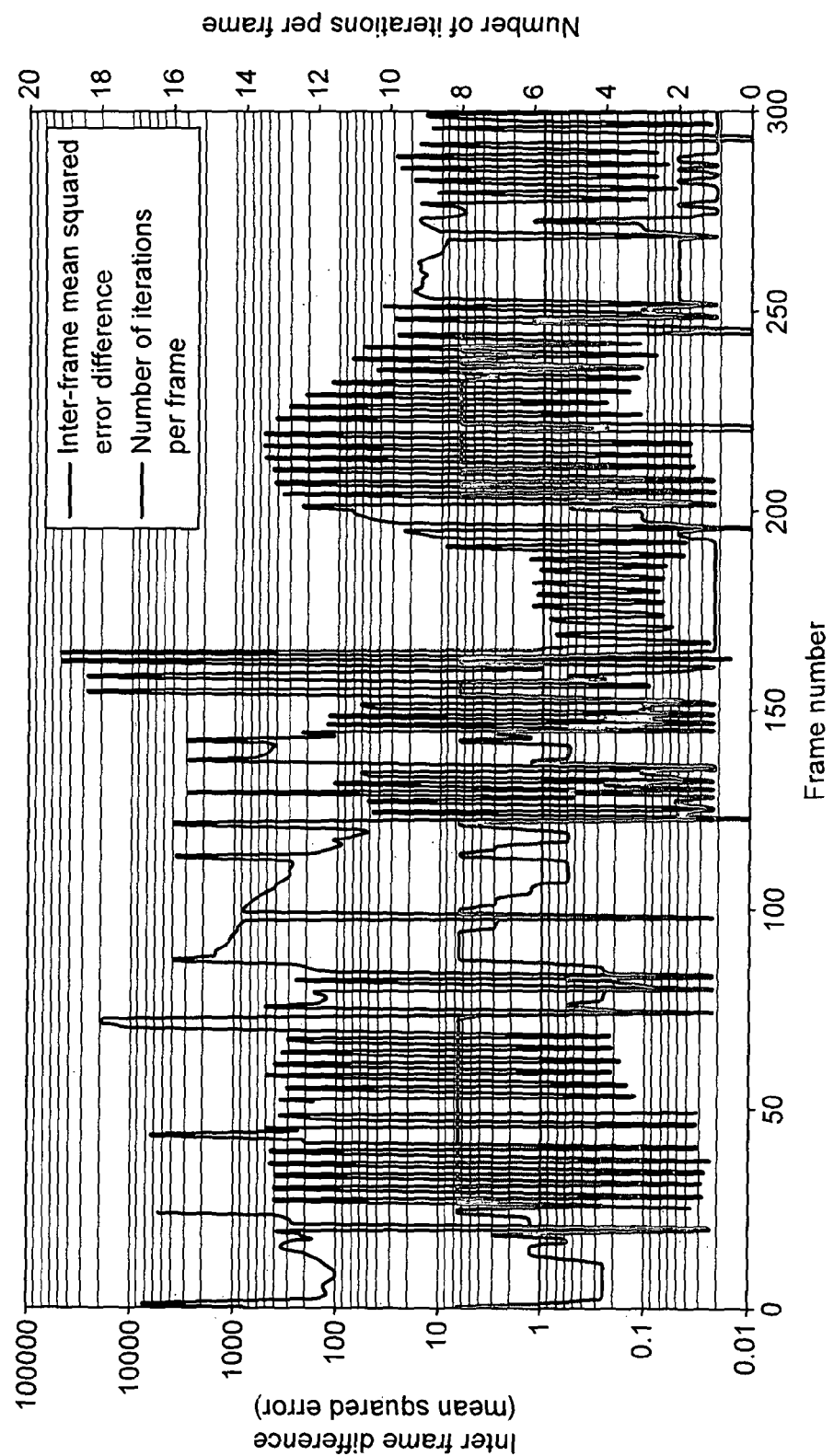
FIG. 6 shows quality driven dynamic allocation of iterations in accordance with embodiments.

This system was implemented and tested against a mean squared error target of 25 (PSNR=34.1 dB) using second AVI video file. The results in FIG. 6 show there is a clear correlation between the number of iterations the algorithm needs to meet a specific target and the magnitude of the inter-frame changes. Using this approach the number of iterations needed to compute the 300 frames in this movie was reduced from 2400 to 1368 a reduction of 43%, or an average of 4.56 iterations per frame.

The quality of the reconstructed hologram may be affect by the so-called zero order problem which is a consequence of the diffractive nature of the reconstruction. Such zero-order light can be regarded as "noise" and includes for example specularly reflected light, and other unwanted light from the SLM.

This "noise" is generally focussed at the focal point of the Fourier lens, leading to a bright spot at the centre of a reconstructed hologram. Conventionally, the zero order light is simply blocked out however this would clearly mean replacing the bright spot with a dark spot.

However as the hologram contains three dimensional information, it is possible to displace the reconstruction into a different plane in space—see, for example, published PCT application WO 2007/131649 incorporated herein by reference.

Whilst embodiments described herein relate to displaying one hologram per frame, the present disclosure is by no means limited in this respect and more than one hologram may be displayed on the SLM at any one time.

For example, embodiments implement the technique of "tiling", in which the surface area of the SLM is further divided up into a number of tiles, each of which is set in a phase distribution similar or identical to that of the original tile. Each tile is therefore of a smaller surface area than if the whole allocated area of the SLM were used as one large phase pattern. The smaller the number of frequency component in the tile, the further apart the reconstructed pixels are separated when the image is produced. The image is created within the zeroth diffraction order, and it is preferred that the first and subsequent orders are displaced far enough so as not to overlap with the image and may be blocked by way of a spatial filter.

As mentioned above, the image produced by this method (whether with tiling or without) comprises spots that form image pixels. The higher the number of tiles used, the smaller these spots become. If one takes the example of a Fourier transform of an infinite sine wave, a single frequency is produced. This is the optimum output. In practice, if just one tile is used, this corresponds to an input of a single phase of a sine wave, with a zero values extending in the positive and negative directions from the end nodes of the sine wave to infinity. Instead of a single frequency being produced from its Fourier transform, the principle frequency component is produced with a series of adjacent frequency components on either side of it. The use of tiling reduces the magnitude of these adjacent frequency components and as a direct result of this, less interference (constructive or destructive) occurs between adjacent image pixels, thereby improving the image quality.

Preferably, each tile is a whole tile, although it is possible to use fractions of a tile.

Although embodiments relate to variants of the Gerchberg-Saxton algorithm, the skilled person will understand that other phase retrieval algorithms may implement the improved method disclosed herein.

The skilled person will understand that the improved method disclosed herein is equally applicable to the calculation of a hologram used to form a three-dimensional reconstruction of an objection. The sequential image frames may be 1D, 2D and/or 3D image frames, or any sequence thereof.

Equally, the present disclosure is not limited to projection of a monochromatic image.

A colour 2D holographic reconstruction can be produced and there are two main methods of achieving this. One of these methods is known as "frame-sequential colour" (FSC). In an FSC system, three lasers are used (red, green and blue) and each laser is fired in succession at the SLM to produce each frame of the video. The colours are cycled (red, green, blue, red, green, blue, etc.) at a fast enough rate such that a human viewer sees a polychromatic image from a combination of the three lasers. Each hologram is therefore colour specific. For example, in a video at 25 frames per second, the first frame would be produced by firing the red laser for $1/75^{th}$ of a second, then the green laser would be fired for $1/75^{th}$ of a second, and finally the blue laser would be fired for $1/75^{th}$ of a second. The next frame would then be produced, starting with the red laser, and so on.

An alternative method, that will be referred to as "spatially separated colours" (SSC) involves all three lasers being fired at the same time, but taking different optical paths, e.g. each using a different SLM, and then combining to form the colour image.

An advantage of the frame-sequential colour (FSC) method is that the whole SLM is used for each colour. This means that the quality of the three colour images produced will not be compromised because all pixels on the SLM are used for each of the colour images. However, a disadvantage of the FSC method is that the overall image produced will not be as bright as a corresponding image produced by the SSC method by a factor of about 3, because each laser is only used for a third of the time. This drawback could potentially be addressed by overdriving the lasers, or by using more powerful lasers, but this would require more power to be used, would involve higher costs and would make the system less compact.

An advantage of the SSC (spatially separated colours) method is that the image is brighter due to all three lasers being fired at the same time. However, if due to space limitations it is required to use only one SLM, the surface area of the SLM can be divided into three equal parts, acting in effect as three separate SLMs. The drawback of this is that the quality of each single-colour image is decreased, due to the decrease of SLM surface area available for each monochromatic image. The quality of the polychromatic image is therefore decreased accordingly. The decrease of SLM surface area available means that fewer pixels on the SLM can be used, thus reducing the quality of the image. The quality of the image is reduced because its resolution is reduced.

The skilled person will understand that a user may view a real image or virtual image of the holographic reconstruction. In particular, embodiments in accordance with the present disclosure may be implemented in a head-up display.

Figure 7:
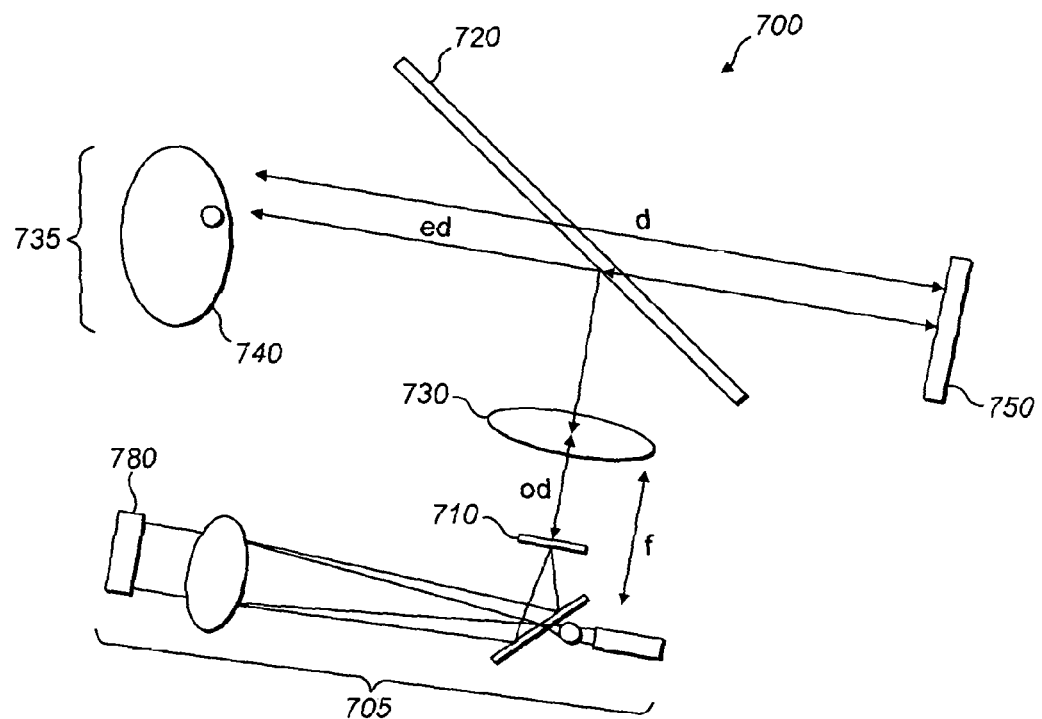
FIG. 7 shows an image projection system in accordance with embodiments.

FIG. 7 shows a head-up display (700) having an SLM based system (705) for providing a real image of a holographic reconstruction (710). The holographic reconstruction is formed at a so-called replay field.

The display consists of an optical combiner (720) and a lens (730) disposed between the holographic reconstruction (710) and the combiner (720). The arrangement is such that a viewer (740) looking towards the combiner (720) will see a virtual image (750) of the holographic reconstruction (710) at a distance d from the viewer and behind the combiner (720). Such a system can be used for example in a head-up display or head-mounted display.

In embodiments, the spatial light modulator is a Liquid Crystal over silicon (LCOS) device. LCOS devices are a hybrid of traditional transmissive liquid crystal display devices, where the front substrate is glass coated with Indium Tin Oxide to act as a common electrical conductor. The lower substrate is created using a silicon semiconductor process with an additional final aluminium evaporative process being used to create a mirrored surface, these mirrors then act as the pixel counter electrode.

Compared with conventional glass substrates these devices have the advantage that the signal lines, gate lines and transistors are below the mirrored surface, which results in much higher fill factors (typically greater than 90%) and higher resolutions.

LCOS devices are now available with pixels between 4.5 μm and 12 μm, this size is determined by the mode of operation and therefore amount of circuitry that is required at each pixel.

Figure 8:
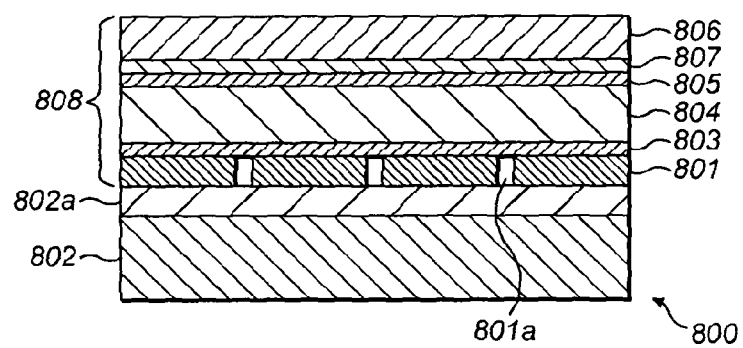
FIG. 8 is a schematic of a LCOS SLM.

The structure of an LCOS device is shown in FIG. 8.

A LCOS device is formed using a single crystal silicon substrate (802). It has a 2D array of square planar aluminium electrodes (801), spaced apart by a gap (801a), arranged on the upper surface of the substrate. Each of the electrodes (801) can be addressed via circuitry (802a) buried in the substrate (802). Each of the electrodes forms a respective planar mirror. An alignment layer (803) is disposed on the array of electrodes, and a liquid crystal layer (804) is disposed on the alignment layer (803). A second alignment layer (805) is disposed on the liquid crystal layer (404) and a planar transparent layer (806), e.g. of glass, is disposed on the second alignment layer (805). A single transparent electrode (807) e.g. of ITO is disposed between the transparent layer (806) and the second alignment layer (805).

Each of the square electrodes (801) defines, together with the overlying region of the transparent electrode (807) and the intervening liquid crystal material, a controllable phase-modulating element (808), often referred to as a pixel. The effective pixel area, or fill factor, is the percentage of the total pixel which is optically active, taking into account the space between pixels (801a). By control of the voltage applied to each electrode (801) with respect to the transparent electrode (807), the properties of the liquid crystal material of the respective phase modulating element may be varied, thereby to provide a variable delay to light incident thereon. The effect is to provide phase-only modulation to the wavefront, i.e. no amplitude effect occurs.

A major advantage of using a reflective LCOS spatial light modulator is that the liquid crystal layer is half the thickness that it would be if a transmissive device were used. This greatly improves the switching speed of the liquid crystal (a key point for projection of moving video images). A LCOS device is also uniquely capable of displaying large arrays of phase only elements in a small aperture. Small elements (typically approximately 10 microns) result in a practical diffraction angle (a few degrees) so that the optical system does not require a very long optical path.

It is easier to adequately illuminate the small aperture (a few square centimetres) of a LCOS SLM than it would be for the aperture of a larger liquid crystal device. LCOS SLMs also have a large aperture ratio, there is very little dead space between the pixels (as the circuitry to drive them is buried under the mirrors). This is an important issue to lowering the optical noise in the replay field.

The above device typically operates within a temperature range of 10° C. to around 50° C., with the optimum device operating temperature being around 40° C. to 50° C.

As a LCOS device has the control electronics embedded in the silicon backplane, the Fill factor of the pixels is higher, leading to less unscattered light leaving the device.

Using a silicon backplane has the advantage that the pixels are optically flat, which is important for a phase modulating device.

Whilst embodiments relate to a reflective LCOS SLM, the skilled person will understand that any SLM can be used including transmissive SLMs.

The invention is not restricted to the described embodiments but extends to the full scope of the appended claims.

The invention claimed is:

1. A method of retrieving phase information in the Fourier domain, representative of the $n^{th}$ frame of a sequence of image frames, for holographic reconstruction of the image frames, the method comprising for each image frame:
  executing an algorithm comprising m iterations of the following sequence of steps, where m is an integer:
    establishing a first data set in the spatial domain having plural elements, each element having first phase information and first amplitude information to define respective phase and amplitude distributions, wherein the amplitude information of the first iteration is representative of the image frame;
    performing a Fourier transform on the first data set to produce a second data set in the frequency domain having plural elements, each element having second amplitude and second phase information to define respective phase and amplitude distributions;
    quantising the second phase information;
    forming a third data set having plural elements, each element having third amplitude and third phase information, the third phase information being the quantised phase information derived from the second data set;
    inverse Fourier transforming the third data set to produce a fourth data set having plural elements, each element having fourth amplitude and fourth phase information;
    modifying the amplitude information of the fourth data set by subtracting the amplitude information of the image frame from the amplitude information of the fourth data set, scaling the subtracted amplitude information by a gain element α and subtracting the scaled amplitude information from the amplitude information of the image frame to produce a fifth data set having plural elements, each element having fifth amplitude and fifth phase information, wherein the phase information of the fifth data set is the phase information of the fourth data set; and using the fifth data set as the first data set of the next iteration, wherein the phase information of the third data set is usable to produce a holographic representation of the image frame at an image plane, the method further comprising the step of:

receiving a control parameter from the algorithm related to retrieval of phase information in the Fourier domain of the $(n-1)^{th}$ frame and using the control parameter in the sequence of steps, wherein the control parameter is a parameter used to control gain or attenuation, wherein the control parameter is the gain element $\alpha$.

2. A method as claimed in claim 1 wherein the image frames are 2D or 3D image frames.

3. A method as claimed in claim 1 wherein the first amplitude information of the first data set is derived from intensity information of the nth frame.

4. A method as claimed in claim 1 wherein the fifth phase information of the fifth data set of the final iteration related to the (n−1)th frame forms the phase information for the first data set of the first iteration related to the $n^{th}$ frame.

5. A method as claimed in claim 1, wherein the first phase information of the first data set for an $m^{th}$ iteration is a scaled form of the difference between the phase information of the fourth data set for the (m−1) and (m−2) iterations related to the $n^{th}$ frame.

6. A method as claimed in claim 1 further comprising stopping the iteration when the mean square error between the fifth amplitude information of the fifth data set and the intensity information of the image frame is less than a threshold.

7. A projector for forming a 2D video image, the projector comprising a spatial light modulator comprising a 2D array of phase modulating elements;

processing means arranged to retrieve phase information in the Fourier domain representative of the nth frame of a sequence of 2D image frames in the spatial domain using the method of claim 1 and driving means arranged to drive the array of phase modulating elements of the spatial light modulator to display data representative of a Fourier transform of a nth frame of a sequence of 2D image frames.

8. A projector as claimed in claim 7 further comprising a light source.

9. A method as claimed in claim 1 wherein the amplitude information of the first data set for the first iteration is derived from intensity information of the image frame.

10. A method as claimed in claim 1 wherein the amplitude information of the first data set for the first iteration is based on amplitude information in the Fourier domain of the $(n-1)^{th}$ frame.

\* \* \* \* \*